Figure 1:
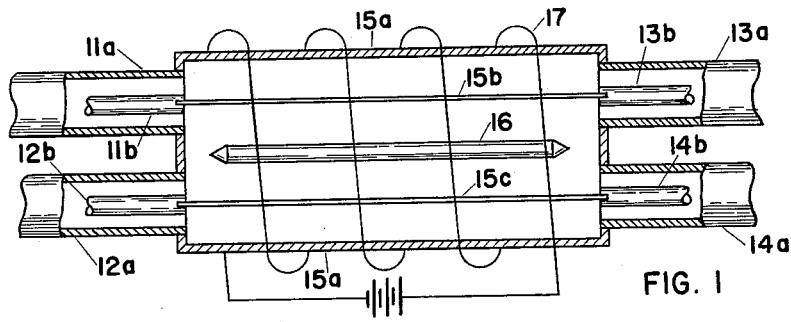

Feb. 20, 1962  A. A. OLINER  3,022,470
EXTREMELY WIDE-BAND, NON-RECIPROCAL COAXIAL COMPONENTS
Filed June 25, 1957  3 Sheets-Sheet 1

INVENTOR.
ARTHUR A OLINER
BY

Feb. 20, 1962  A. A. OLINER  3,022,470
EXTREMELY WIDE-BAND, NON-RECIPROCAL COAXIAL COMPONENTS
Filed June 25, 1957  3 Sheets-Sheet 2
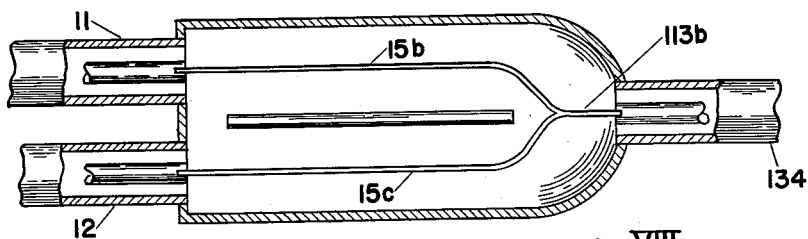
FIG. 6
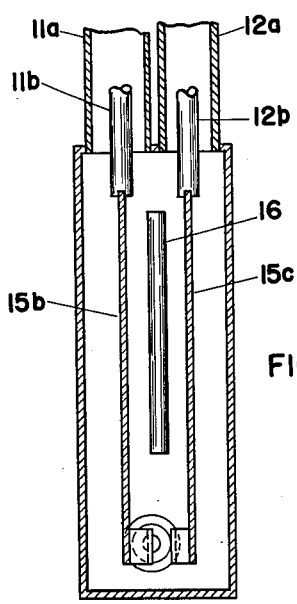
FIG. 8
SECTION VIII-VIII
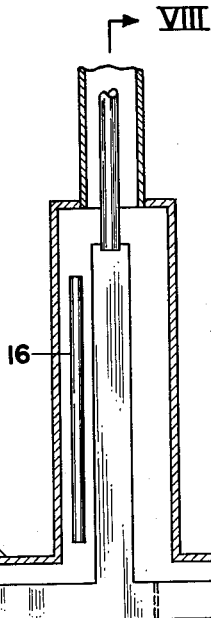
FIG. 7
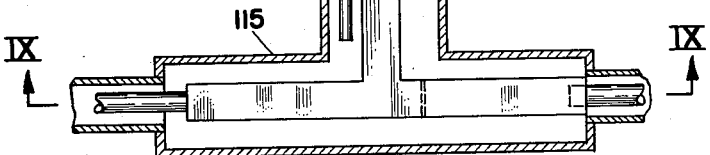
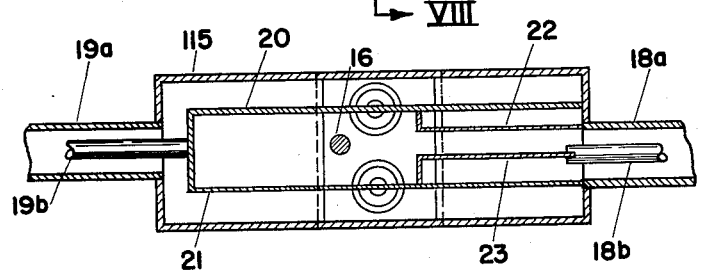
FIG. 9  SECTION IX-IX
INVENTOR.
ARTHUR A. OLINER.
BY

INVENTOR.
ARTHUR A. OLINER
BY

United States Patent Office

3,022,470
Patented Feb. 20, 1962

3,022,470
EXTREMELY WIDE-BAND, NON-RECIPROCAL
COAXIAL COMPONENTS
Arthur A. Oliner, Brooklyn, N.Y., assignor to Merrimac
Research and Development Corporation, Flushing,
N.Y., a corporation of New York
Filed June 25, 1957, Ser. No. 667,951
10 Claims. (Cl. 333—7)

It is an object of this invention to form very wide-band nonreciprocal components for direct use with coaxial lines. The phrase "Shielded Multiconductor Paraxial System of Lines," or, as it will be hereafter referred to as a "Shielded Paraxial Line System," is used herein to mean that one conductor is employed as a shield surrounding, or nearly surrounding, several others, and that all conductors have parallel axes.

The class of gyromagnetic materials to which we refer is quite large and is well known. We have here used ferrite as the specific example; but the class includes many spinels and garnets and some liquid and gaseous substances, all of which are adapted to use in this apparatus.

It is one object of the invention to form a novel type of coaxial load isolator which is essentially independent of frequency over broad ranges. It is a further object to form circulators over such frequency bands employing similar principles of operation.

It is a further object to form a directional coupler whose coupling properties are constant over an extremely wide band of frequencies. Included in this category is the 3 db, or equal power split, type of coupler. Also included in this grouping is a power splitter of any prescribed power division.

It is a further object, again employing the same principles of operation, to form a balun, or balance-to-unbalance transformer, which operates over an extremely wide frequency range.

It is a further object to provide means of modulating the magnetic field applied to such structures so as to form either a modulator, a variable power divider, a variable attenuator, or a switching element.

We may recall that the symmetric voltage excitation leads to a linear polarization of magnetic field parallel to the plane of symmetry between conductors, whereas the antisymmetric component leads to a perpendicular symmetric field. Since a circular magnetic polarization may be created from two linear components in phase quadrature (i.e. 90° phase difference) we may obtain such circular polarization by regrouping the symmetric and antisymmetric modes with the proper sign of phase quadrature to establish either mode of circular polarization. Faraday rotation takes place because of the existence of circular polarization components in much the same fashion that it occurs in more conventional devices.

Since the new device relates to Faraday rotation in a transverse electromagnetic wave guide structure (when the gyromagnetic medium is absent), means must be provided to establish excitations of circular polarizations of the radio frequency magnetic fields to the gyromagnetic element within such a guide. Further, to achieve the broad band requirement set forth above, no access may be permitted to frequency-limited devices, such as quarter-wave plates, to provide such functions. While these circular polarization excitations are only incidental to the overall operation of the foregoing devices, they are, nevertheless, of fundamental nature to this invention. We shall therefore discuss the principles of operation of this new device, and the essential components thereof, and thereafter we will disclose a practical embodiment.

Figure 2:
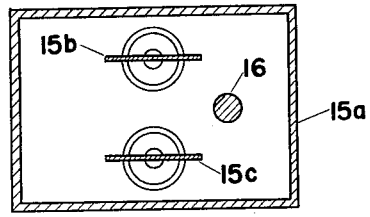
Figure 3A:
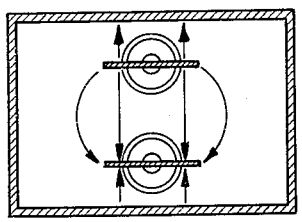
Figure 3B:
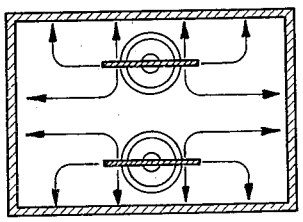
Figure 4A:
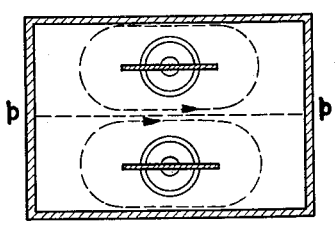
Figure 4B:
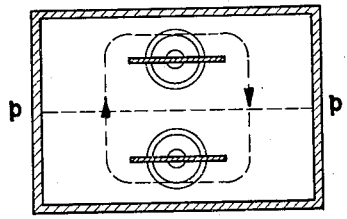
Figure 5:
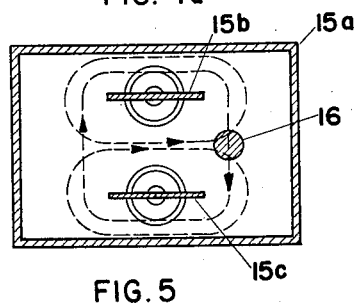
Figure 10:
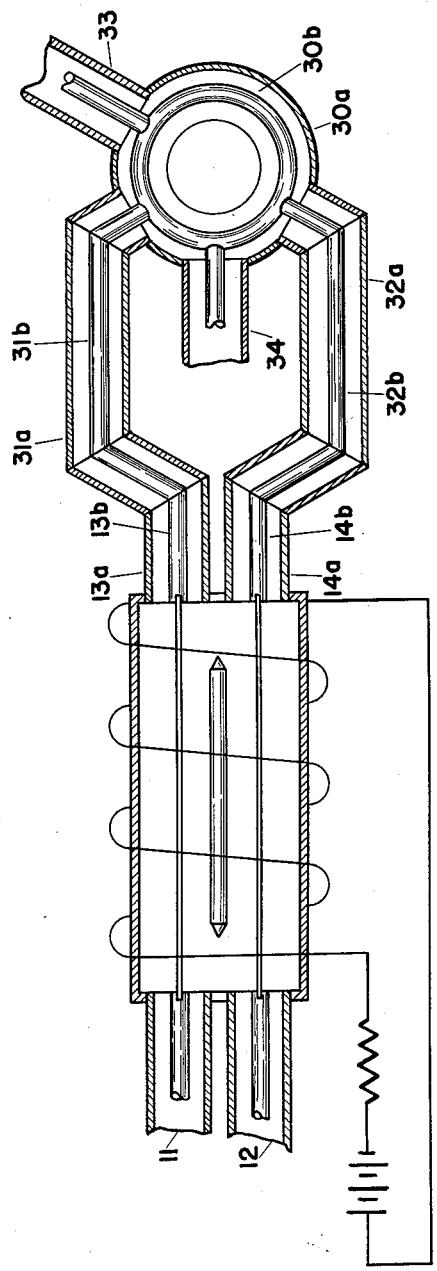
Figure 12:
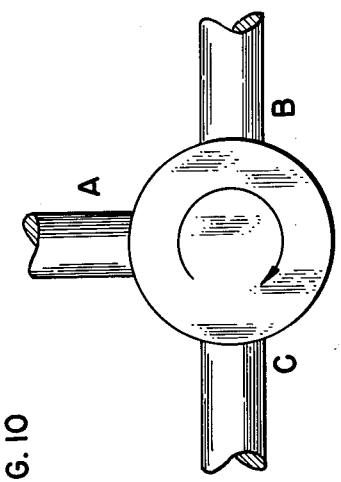
Figure 11:
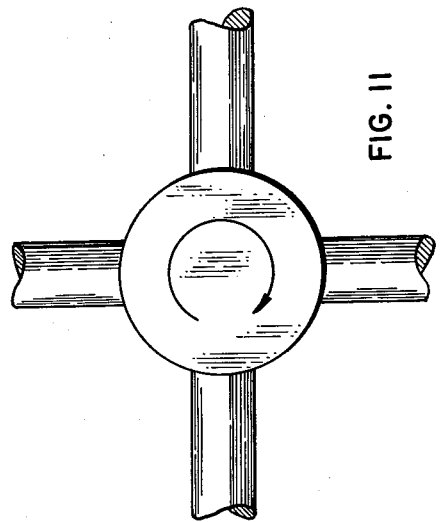

In the drawings, FIG. 1 is a longitudinal cross section of a device embodying the invention as a four-arm circulator; FIG. 2 is a transverse diagrammatic section through the central portion of the device of FIG. 1; FIGS. 3a and 3b are sections similar to FIG. 2 of the type of junction used in this invention, with the gyromagnetic element omitted, to show the electric lines of force of the degenerate modes of vibration established within such a device before the gyromagnetic element is added; FIGS. 4a and 4b are similar to FIGS. 3a and 3b, but showing the magnetic field distribution instead of the electrical; FIG. 5 is similar to FIG. 2, showing a superposition of the fields of FIGS. 4a and 4b and showing the location of the gyromagnetic element in the field; FIG. 6 is a view similar to FIG. 1, but showing the parts connected to form a three-arm circulator; FIG. 7 is a sectional view of a four-arm circulator with a hybrid structure built into the body; FIG. 8 is a section on the line VIII—VIII of FIG. 7; FIG. 9 is a section on the line IX—IX of FIG. 7; FIG. 10 shows the four-arm circulator of FIG. 1 coupled to a coaxial hybrid T; FIG. 11 is a schematic view of a four-arm circulator embodying this invention and FIG. 12 is a similar diagram for a three-arm circulator.

In the drawings, in FIG. 1 there are shown four coaxial lines, two on each side, which are connected by the central portion, which is itself a twin conductor line. The outer conductors of each of these lines bears the subscript "a," as 11a, 12a, etc., while the inner conductors bear the subscript "b." In the central portion, the lower of the twin conductors bears the subscript "c." These conductors will here be referred to as strips, but they may be of other cross sections without altering the principle of the device. The outer conductors of all four lines are connected directly to outer conductor 15a, while the inner conductors 11b and 13b are connected to the opposite ends of strip 15b and the inner conductors 12b and 14b are similarly connected to the lower strip 15c. Means are also provided for establishing a longitudinal controlled magnetic field here shown as a coil 17 surrounding the device.

It is well known, especially in the field of A.C. machinery, that fields have a dual representation, and where these are valid alternate descriptions. There exists a set of linear fields describing mutually perpendicular directions in any one plane, or there is the set of counter-rotating fields useful to considerations of rotating machines.

The even and odd modes, in reference to the present application, provide the two linear components A quadrature phase relationship between the even and odd modes provides the two senses of circular polarization depending on whether the quadrature is leading or lagging, which normally balance each other out.

The device does not need separate device to generate circular polarization, it comes about automatically when either one of the component fields is altered. Actually what is normally present is a linear polarization which is equivalent to two oppositely rotating perfectly balanced circular polarizations. Therefore, both circular polarizations are automatically present. In some devices (not ours) only a single circular polarization is required, and the other must be eliminated. In such cases, a separate device must be employed to destroy or eliminate the one not wanted. In our device we do not need to rid ourselves of the other circular polarization. This furnishes a very significant advantage over other devices, because the device usually employed to eliminate one of the circular polarization is frequently sensitive. These modes, associated with FIGS. 3 and 4, are linear polarizations, in contrast to the circular polarizations referred to above. These are exactly equivalent to a suitable combination of the circular polarizations, and are also natural to the symmetry of the configuration and therefore pre-exist in it. They therefore do not have to be "excited."

The operation of the device shown in FIGS. 1, 2 and 5 may be more clearly understood by first considering the energy distribution within such a device with the gyromagnetic material omitted, as shown in FIGS. 3a–3b and 4a–4b. Because of the symmetry of the geometry, the transverse distributions of the electromagnetic field must correspond to this symmetry and provide modes of transmission of both symmetric and antisymmetric forms commensurate with such symmetry. The antisymmetric mode is that in which the center conductors are at equal but opposite potentials with respect to the grounded housing. FIG. 3a shows the electric field lines associated with this mode, while FIG. 4a shows the magnetic field lines. The symmetric mode of the guide is that in which the twin center conductors of the guide operate at the same potential with respect to the grounded housing. FIG. 3b demonstrates the electric field lines for this mode, while FIG. 4b shows the corresponding magnetic field lines.

There exists, in the empty guide structure, as shown in FIGS. 4a and 4b, a symmetry plane pp which is a perpendicular bisector of a line perpendicular to and joining the two center conductors. We may call the intersection of this plane with the plane of the drawing the symmetry axis. We find from FIG. 4a that the magnetic lines of the antisymmetric mode are tangential to this symmetry plane and are at their greatest strength in the region between the center conductors. Similarly, from FIG. 4b we find that the magnetic lines of the symmetric mode are perpendicular to the symmetry axis and grow stronger exterior to the region between the two center conductors. If the symmetric and antisymmetric modes are made to support the same flow of power, there exists at least one point on the transverse symmetry axis for which the tangential and perpendicular magnetic fields are equal. By symmetry, there must then exist at least two points on the symmetry axis (one on each side) for which this field equality exists. Let us now re-organize the modal description of the guide into a regrouping of the symmetric and antisymmetric modes such that they now have a 90° phase displacement between them. One of these regrouped modes then corresponds to a phase lead and the other to a phase lag.

Choosing one of the points of field equality alluded to above, the magnetic fields at this point are observed to be circularly polarized, with a sense of polarization dependent on which of the regrouped modes leads a phase and which lags. A longitudinally extending gyromagnetic material such as a magnetized ferrite rod, preferably thin, placed at such a point, interacts with the microwave field in a manner consonant with the existence of a circularly polarized magnetic field and finds the new modal admixture "natural" in the sense that such a mode is an independent field solution of the guide and does not "separate out" as the wave progresses down the guide. This is the structure of FIGS. 1, 2, and 5.

The gyromagnetic material, which, for convenience, we will here call the ferrite rod, interacts more strongly with that mode having a rotation sense compatible with the spin precession of the ferrite. The sense of precession of the spin system of the ferrite depends, in turn, on the sense of the applied longitudinal magnetic field, provided in FIG. 1 by the solenoid 17.

Since one of the natural modes, because of the spin compatibility, interacts more strongly with the ferrite than does the other mode of opposite phase quadrature, it becomes slowed in phase velocity relative to the other, so that a phase velocity differential exists between the two. It may be shown that for a thin ferrite rod having but a small applied magnetic field sufficient to saturate it, the differential of electrical angle for a given length of the wave guide structure is essentially constant with respect to frequency past a minimum value of frequency, the latter being dependent only on the ferrite magnetization. It will be shown that the modified Faraday rotation occurring in the TEM system here disclosed, as in the case of more conventional (TE) guide structures, depends only on the electrical angle differential and, as such, provides frequency insensitive results.

It is well known that the frequency sensitivity of Faraday rotation devices is contributed to from two sources: the frequency dispersion of the wave guide itself, and the properties of the ferrite employed. The latter contribution can be made negligible if the frequency of operation is high enough relative to the saturation magnetization of the ferrite employed. This condition can be readily achieved in practice. The former contribution, that of the frequency dispersion of the wave guide itself, is present in conventional guides of the TE or TM type, but it is completely eliminated by the use of a TEM structure such as the one proposed herein. For these reasons, the devices described here are essentially frequency independent.

Let us now excite but a single conductor of the ferrite-loaded structure. Such an excitation must be expressed as an appropriate summation over the two natural distributions of the guide. Travelling down the guide, the two natural modes separate out due to their phase velocity differential, and the magnitude of the excitations on the twin conductors at any point depends only on the electrical length differential. We find, therefore, a coupling phenomenon occurring between the two center conductors which depends only on the electrical length differential and, as such, occurring in a manner substantially independent of frequency. The manner of coupling that takes place is sinusoidal with respect to electrical angle differential, as is the case in general for distributed couplers, and the state of excitation at any point may be given by the representation:

$$\begin{pmatrix} \cos \theta/2 \\ \sin \theta/2 \end{pmatrix}$$

The upper term of the column array is the potential of the upper conductor with respect to the housing, and the lower term relates similarly to the lower conductor of the guide. The quantity $\theta$ is the electrical length differential given as a function of length as the observer progresses down the guide from the exciting source. At the source, $\theta=0$, so that the representation shows only the upper conductor to have been excited. As $\theta$ increases, the lower conductor becomes progressively more excited, carrying all the energy at $\theta=\pi$.

The quantity $\theta$, as is its analog in circular Faraday rotator devices, is non-reciprocal in that it possesses the same sign irrespective of the direction of flow of energy. Thus, $\theta$ is cumulative with respect to both incident and reflected waves propagating in the wave guide. To within a reciprocal phase constant, therefore, a wave striking a reflecting barrier or termination simply reverses and continues to act in the new direction of motion precisely as if the barrier had not been present.

The four-arm structure we have just described forms the basis for all embodiments of this invention, and among the uses to which it may be put, or for which it may be adapted, we may mention the following:

(1)(a) Circulator (4-arm)
   (b) Circulator (3-arm)
(2) Isolator
(3) Gyrator
(4) Balance-to-unbalance transformer or Balun
(5) Directional coupler
(6) Variable power splitter
(7) Switching functions

Four-arm circulator

Let us first describe the device when serving as a four-arm circulator, as shown in FIGS. 1, 2, 5, and 10.

For this purpose, we may connect the circulator to a hybrid ring as shown in FIG. 10. Such a hybrid ring comprises a circular coaxial member having an outer conductor 30a and an inner conductor 30b. These are connected at one point by a coaxial line comprising an outer conductor 31a connected to the conductor 13a of the circulator and an inner conductor 31b connecting the inner conductor 30b to the inner conductor 13b of the circulator.

At another point conductors 30a and 30b are connected by a coaxial line comprising an outer conductor 32a connecting conductor 30a to the conductor 14a of the circulator and an inner conductor 32b connecting the inner conductor 30b to the inner conductor 13b of the circulator.

Coaxial lines 33 and 34 lead from the ring at points such that the line 33 will be energized only when the lines 31 and 32 are energized in opposite phase, whereas the line 34 will be energized when those two lines 33 and 34 are energized in the same phase. The operation of the hybrid ring need not be further disclosed as it is well known.

Let us form the twin strip coaxial structure to have an electrical length differential of $$\frac{\pi}{2}$$

If we apply a unit excitation to port 11 in FIG. 10, then, applying the column vector representation scheme, we have at the input $$\begin{pmatrix} 1 \\ 0 \end{pmatrix} = \begin{pmatrix} \cos \theta \\ \sin \theta \end{pmatrix}$$

As the wave energy propagates down the guide, the angle $\theta$ varies from its value of zero at the input to the value $$\frac{\pi}{2}$$

at the termination of its first transit. At this value of $\theta$, the excitation representation becomes at ports 13 and 14

$$\begin{pmatrix} \cos \pi/4 \\ \sin \pi/4 \end{pmatrix} = \frac{\sqrt{2}}{2} \begin{pmatrix} 1 \\ 1 \end{pmatrix}$$

we find, therefore, that terminals 13 and 14 are symmetrically excited. If these ports are connected into a coaxial hybrid ring, as shown in FIG. 10, only the symmetric junction 34 of the hybrid is excited to the exclusion of the antisymmetric arm 33.

If the energy is reflected from the symmetric junction 34, or, equivalently, if energy is incident from the junction, the wave continues in transit and $\theta$ accumulates to a value of $\pi$ producing at ports 11 and 12 the distribution $$\begin{pmatrix} \cos \pi/2 \\ \sin \pi/2 \end{pmatrix} = \begin{pmatrix} 0 \\ 1 \end{pmatrix}$$

which demonstrates that port 12 is excited.

If, next, the energy is reflected from port 12 to the right hand terminals, $\theta$ accumulates, in transit, to the value of $$\frac{3\pi}{2}$$

The excitation at the right is then of the form at ports 12 and 13:

$$\begin{pmatrix} \cos 3\pi/4 \\ \sin 3\pi/4 \end{pmatrix} = \frac{\sqrt{2}}{2} \begin{pmatrix} -1 \\ 1 \end{pmatrix}$$

Thus the port pair 13—14 is excited antisymmetrically and the total output is produced at the antisymmetrical output port 33 of the hybrid ring.

Finally, if energy is reflected from this terminal 33, the wave propagates to the left with $\theta$ accumulating to the value $2\pi$. The excitation becomes at 11—12

$$\begin{pmatrix} \cos \pi \\ \sin \pi \end{pmatrix} = \begin{pmatrix} -1 \\ 0 \end{pmatrix}$$

The cycle is complete in that the energy is finally reflected back to port 11, the port which was employed to excite the system initially. The fact that this reflected energy finally returns with an additive negative sign on the potential applied to port 11 implies a nonreciprocal 180° phase shift and relates to the gyrator action of this device which will be discussed in a later section.

We may sum up the action of the four-arm circulator presented in FIG. 10 by the schematic diagram shown in FIG. 11. The arrow, showing the cycle of operation of the circulator, is reversed with a reversal of the direction of the applied magnetic field.

The type of circulator just described depends for its band-width on the excellence of separation of symmetric and antisymmetric excitations. With the particular instrumentation shown with a hybrid ring, this separation is necessarily band limited, depending, as it must in general for such structures, on the use of quarter wave sections.

Although not shown, such separation can be accomplished over a fairly broad frequency band by the use of balance-to-unbalance transformers, which will be discussed in a later section.

A hybrid structure can also be built into the body of the circulator, as shown in FIGS. 7, 8 and 9. This hybrid is more broad-band than the conventional coaxial hybrid ring, although it does not possess the band width of the rest of the circulator itself. The basic structure and principle of operation has already been described in copending patent application No. 584,984, although the structure there shown is not identical with this.

In this embodiment strips 15b and 15c, instead of being connected to lines 13 and 14, are connected to parallel strips 20 and 21, respectively, housed within the outer conductor 115, so as to produce a balance-to-unbalance transformer. As will be understood, strips 20 and 21 are a quarter wave length long and are joined at their ends to inner conductor 19b of a coaxial line of which the outer conductor is connected directly with outer conductor 115. The other coaxial line has its outer conductor 18a connected to conductor 115, and the outer conductor 18a and inner conductor 18b are connected to strips 22 and 23 which are of quarter wave-length and connect to strips 20 and 21, respectively. Thus, an odd mode of excitation of 15b and 15c will energize line 18a—18b only and an even mode will energize line 19a—19b only. Dimensions of the structure are so apportioned, employing quarter wave sections, that the symmetric and antisymmetric outputs have no spurious loading effects on one another.

The cycle of operation of this circulator is identical to that described for FIG. 10 upon simple substitution of port 18 for 33 and port 19 for 34.

Three-arm circulator

The device of FIG. 1 may be simplified as shown in FIG. 6 for certain purposes by connecting strips 15b and 15c internally to a common terminal 113b, which forms the center conductor of outlet line 134, thus forming a three-arm circulator as shown. This is the equivalent of the four-arm structure but with the antisymmetric junction completley suppressed or, more rigorously, with the antisymmetric arm made totally reflecting. We thus obtain the schematic equivalent shown in FIG. 12. The symmetric junction can be made broad over a very large bandwidth so that the structure of FIG. 6 is considerably more broad band than are the structures of FIGS. 7 and 10.

Isolators

If, in FIG. 6, we place a matched load in port 12, energy incident from 11 exits at terminal 134; any reflections from 134 are absorbed in 12. Thus, no energy returns, in principle, to port 11, providing an isolator action. If the direction of applied magnetic field is reversed, the isolator is formed in alternate fashion by placing the absorbing load in arm 134. The cycle of operation is now such that energy flows from port 11 to port 12. Any energy reflected by 12 is completely absorbed in the load at 134, preventing any return of energy to port 11.

The isolator differs from the three-arm circulator in that the port having the matched termination is permanently connected so that this terminal is not accessible. The isolator therefore has only two accessible ports in contrast to the three of the circulator.

Gyrators

The gyrator is defined as an element having a lossless transmission characteristic in one direction and the same transmission characteristic, but with an added 180° phase shift, for propagation in the reverse direction. Such a structure is obtained by choosing $\theta = \pi$ in the twin conductor ferrite device of FIG. 1.

Referring now to the four-port structure of FIG. 1: If port 11 only is excited, the input has the representation $$\begin{pmatrix} 1 \\ 0 \end{pmatrix} = \begin{pmatrix} \cos \theta/2 \\ \sin \theta/2 \end{pmatrix}$$

so that $\theta$ initially has the value zero. As the wave energy propagates to the right hand pair of terminals, $\theta$ accumulates to a value of $\pi$ so that the excitation becomes $$\begin{pmatrix} \cos \pi/2 \\ \sin \pi/2 \end{pmatrix} = \begin{pmatrix} 0 \\ 1 \end{pmatrix}$$

All energy now exits at port 14 so that the structure is essentially a zero db directional coupler. If, now, port 14 is excited, $\theta$ has an initial value of $\pi$ and accumulates to a value of $2\pi$ in the transit of energy to the left. The excitation at the left end, is, therefore, $$\begin{bmatrix} \cos \dfrac{2\pi}{2} \\ \sin \dfrac{2\pi}{2} \end{bmatrix} = \begin{pmatrix} -1 \\ 0 \end{pmatrix}$$

We note that the wave transmitted to port 11 from port 14 has a negative sign, implying an added (nonreciprocal) 180° phase shift over the transmission from 11 to 14.

Since ports 12 and 13 are not excited in principle, they may be left open-circuited or short-circuited, as the case may be, with no effect on device operation. The structure acts, therefore, as a gyrator.

Balance to unbalance transformers (Balun)

The structure of FIG. 6 may be constructed to form a balance-to-unbalance transformer, commonly known as a balun. In this case, the electrical length differential is chosen to be $\pi$ instead of $$\frac{\pi}{2}$$

as in the case of the circulator.

Let us place an antisymmetric potential excitation at ports 11 and 12, with respect to the grounded housing. This excitation has the column representation:

$$\frac{1}{\sqrt{2}}\begin{pmatrix} 1 \\ -1 \end{pmatrix} = \begin{bmatrix} \cos\left[\frac{1}{2}\left(\frac{-\pi}{2}\right)\right] \\ \sin\left[\frac{1}{2}\left(\frac{-\pi}{2}\right)\right] \end{bmatrix}$$

The wave transmission to the right hand terminals causes $\theta$ to accumulate to a value $\pi$ greater than its initial value $$\frac{-\pi}{2}$$

so that the output excitation becomes:

$$\begin{bmatrix} \cos\left[\frac{1}{2}\left(\frac{\pi}{2}\right)\right] \\ \sin\left[\frac{1}{2}\left(\frac{\pi}{2}\right)\right] \end{bmatrix} = \frac{1}{\sqrt{2}}\begin{pmatrix} 1 \\ 1 \end{pmatrix}$$

The excitation at ports 13 and 14 is therefore symmetric. If the inner conductors are combined internally, as shown all energy exits from port 134 in unbalanced fashion. We have thus transformed the antisymmetric, or balanced, input to a symmetric, or unbalanced, output. The terms balanced and unbalanced are employed in common practice as synonymous with anti-symmetric and symmetric respectively, which are defined on pages 3 and 4.

If the energy had been put into the system originally from the unbalanced end, a balanced excitation would have appeared at the other end, but with a nonreciprocal gyrator effect of an added $\pi$ radians. Thus, for an electrical length differential of $\pi$, the structure of FIG. 6 is equivalent to a cascade of a balun and a gyrator. If the gyrator effect is undesirable, we may simply add another gyrator to cancel it out.

Directional couplers

The four-port twin strip structure is easily adapted to forming a directional coupler. Considering FIG. 1, let port 11 only be excited, so that we have the input excitation representation:

$$\begin{pmatrix} 1 \\ 0 \end{pmatrix}$$

If the electrical length differential is $\theta$, then the output excitation at ports 13 and 14 is represented by $$\begin{bmatrix} \cos \dfrac{\theta}{2} \\ \sin \dfrac{\theta}{2} \end{bmatrix}$$

From the above, we see that port 11 does not couple to port 12 but that port 14 is excited by a value $$\sin \frac{\theta}{2}$$

Thus we have a directionally coupled structure.

If port 13 were originally excited, we should have had the identical mathematical operations, since $\theta$ always accumulates in the same direction irrespective of the direction of wave flow. Thus, the coupling from port 11 to port 14 is exactly the same as the coupling from port 13 to port 12.

For a bilateral coupler, an additional consideration of gyrator action enters. Therefore, if the exciting source were placed at port 12 or port 14, we would have found that the couplings from port 12 to port 13 and from port 14 to port 11 are equal but are the negatives of the couplings of reverse ordering. Thus, the structure designated here as a bilateral directional coupler is a directional coupler to within the addition of a gyrator element. This is, however, of minor importance.

Variable power splitters

The angle $\theta$ indicated in the device of FIG. 1 is a general function of the magnetization of the ferrite and of the externally applied field. We may thus vary $\theta$ by varying this magnetic field, or by operating the applied field on the unsaturated portion of the ferrite magnetization curve, to effect the equivalent of a change in magnetization. Thus, modulating the external magnetic field on the directional coupler effectively provides a variable power splitting operation.

Switching functions

The cycle of operation of the circulators depends on the direction of applied magnetic field. Let us consider a three-arm circulator such as shown diagrammatically in FIG. 12 with the cycle A—B—C. Then, all energy incident at A appears at B, if matched, and none at C. If the direction of magnetization is reversed, the cycle becomes A—C—B, and all energy incident at A is switched into C.

What is claimed:

1. A nonreciprocal electromagnetic wave component comprising a pair of elongated conductors spaced from and coextending parallel to each other, a surrounding conductive shield like disposed with respect to both conductors of said pair and forming TEM mode transmission lines therewith, the inner conductor of a separate coaxial transmission line attached to each end of each of the two conductors of said conductor pair, and the outer conductors of each of said coaxial transmission lines connected to said surrounding conductive shield, an elongated element of material magnetically polarized in the axial direction and exhibiting the gyromagnetic effect, coextending parallel to said conductor pair on substantially the plane of symmetry between said pair in the region on substantial circular polarization of the normal modes of the gyromagnetically-loaded structure, and means for exciting separately and independently at least one conductor of said conductor pair.

2. A directional coupler comprising the component according to claim 1 wherein the length of said gyromagnetic element is prescribed so that energy supplied to one of said coaxial transmission lines and transmitted along one conductor of said conductor pair is partially coupled to the other conductor of said conductor pair, and is essentially entirely divided in a specified ratio between two of the other said coaxial transmission lines.

3. A variable directional coupler comprising the directional coupler according to claim 2 in which the magnetic polarization is accomplished by means of an externally applied magnetic field arranged parallel to the direction of the extension of said gyromagnetic element, and where means are provided for altering the magnitude of said magnetic field to alter the coupling ratio.

4. A switch comprising the coupler structure according to claim 3 wherein two states of said magnetic field are specified so that all of the energy exits from one or from the other, respectively, of the two said output coaxial lines.

5. A gyrator comprising the component according to claim 1 wherein the length of said gyromagnetic element is adjusted to produce essentially complete power transfer from one conductor to the other conductor of said conductor pair, and the difference in phase of the energy between one end of one conductor and the other end of the other conductor due to transmission in one direction is 180° different from that due to transmission in the opposite direction.

6. A four arm circulator comprising the component according to claim 1 wherein two of the said coaxial transmission lines at the input end form two of the four arms of the circulator, the length of said gyromagnetic element being adjusted to produce equal power division between the two output coaxial transmission lines, these two output coaxial transmission lines being connected one each to two conjugate arms of a hybrid junction, with the remaining two arms of said hybrid junction forming the other two of the four arms of the circulator.

7. A three arm circulator comprising a pair of elongated conductors spaced from and coextending parallel to each other, a surrounding conductive shield like disposed with respect to both conductors of said pair and forming TEM mode transmission lines therewith, the inner conductor of a separate coaxial transmission line attached to each of the two conductors of said conductor pair at one end, the conductors of said conductor pair joined together at their other ends and said common connection attached to the inner conductor of a third coaxial transmission line, the outer conductors of these said coaxial transmission lines connected to said surrounding conductive shield, these three coaxial transmission lines constituting three accessible ports, an elongated element of material magnetically polarized in the axial direction and exhibiting the gyromagnetic effect, coextending parallel to said conductor pair on substantially the plane of symmetry between said pair in the region of substantial circular polarization of the normal modes of the gyromagnetically-loaded structure, means for exciting separately and independently at least one of said accessible ports, and with a length of said gyromagnetic element such that all energy entering one of said ports is completely coupled to a specific other one of said ports, where the ordering of ports occurs in a cyclic fashion.

8. An isolator comprising the structure according to claim 7 wherein a substantially reflectionless matched termination is placed at one of said ports.

9. An electromagnetic wave component comprising a pair of elongated conductors spaced from and co-extending parallel to each other, a surrounding conductive shield like disposed with respect to both conductors of said pair and forming TEM mode transmission lines therewith, an elongated element of material magnetically polarized in the axial direction and exhibiting the gyromagnetic effect, coextending parallel to said conductors on substantially the plane of symmetry between said pair of conductors in the region of substantial circular polarization of the normal modes of the gyromagnetically-loaded structure, means for exciting the two conductors of said conductor pair at one end with opposite phases to each other, with the conductors of said conductor pair joined together at their other ends and where said common connection is provided with a means for being separately and independently excited, this common connection being attached to the inner conductor of a coaxial transmission line with the outer conductor of said coaxial line connected to said surrounding shield, and with a length of said gyromagnetic element such that a balanced electrical signal applied to the said conductor pair at their accessible end emerges as an unbalanced electrical signal in the coaxial line, and vice versa.

10. A nonreciprocal electromagnetic wave component comprising a pair of elongated conductors spaced from and co-extending parallel to each other, a surrounding conductive shield like disposed with respect to both said conductors of said pair and forming TEM mode transmission lines therewith, the inner conductor of a separate coaxial transmission line attached to each of the two conductors of said conductor pair at one end, with the outer conductors of said coaxial lines connected to said surrounding conductive shield, two additional coaxial lines attached so that the inner conductor of one of said additional coaxial lines is connected by a quarter wave stub to the other end of both of the conductors of said elongated conductor pair, and its outer conductor is connected to said surrounding shield, while the inner conductor of the other of said additional coaxial lines is attached to said other end of one of the conductors of said elongated conductor pair, and its outer conductor attached to said other end of the other conductor of said elongated conductor pair, both said last-mentioned connections being made by quarter wave stubs, an elongated element of material magnetically polarized in the axial direction and exhibiting the gyromagnetic effect, coextending parallel to said elongated conductor pair on substantailly the plane of symmetry between said pair in the region of substantial circular polarization of the normal modes of the gyromagnetically-loaded structure, the four said coaxial transmission lines constituting four accessible ports, means for exciting separately and independently at least one of said accessible ports, and with a length of said gyromagnetic element such that all energy entering one of said ports is essentially completely coupled to a specific other one of said ports, where the ordering of ports occurs in a cyclic fashion.

References Cited in the file of this patent

UNITED STATES PATENTS

| | | |
|---|---|---|
| 2,532,317 | Lundstrom | Dec. 5, 1950 |
| 2,561,489 | Bloch et al. | July 24, 1951 |
| 2,615,982 | Zaslavsky | Oct. 28, 1952 |
| 2,657,361 | Henning | Oct. 27, 1953 |
| 2,716,219 | De Bell | Aug. 23, 1955 |
| 2,748,353 | Hogan | May 29, 1956 |
| 2,789,271 | Budenbom | Apr. 16, 1957 |
| 2,792,550 | Backstrand | May 14, 1957 |
| 2,892,158 | Rowen | June 23, 1959 |
| 2,892,159 | Turner | June 23, 1959 |
| 2,892,161 | Clogston | June 23, 1959 |
| 2,895,114 | Rowen | July 14, 1959 |
| 2,913,678 | Fox | Nov. 17, 1959 |

FOREIGN PATENTS

| | | |
|---|---|---|
| 1,111,860 | France | Nov. 2, 1955 |
| 541,439 | Italy | Mar. 29, 1956 |
| 1,002,417 | Germany | Feb. 14, 1957 |